United States Patent
Xu et al.

(10) Patent No.: US 7,706,802 B2
(45) Date of Patent: Apr. 27, 2010

(54) MEDIA GATEWAY INTERCONNECT ROUTING IN A SOFTSWITCH ENVIRONMENT

(75) Inventors: Jianming Xu, Plano, TX (US); Brahmananda Vempati, Dallas, TX (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 547 days.

(21) Appl. No.: 10/599,972

(22) PCT Filed: Apr. 21, 2005

(86) PCT No.: PCT/US2005/013793

§ 371 (c)(1),
(2), (4) Date: Oct. 16, 2006

(87) PCT Pub. No.: WO2005/107198

PCT Pub. Date: Nov. 10, 2005

(65) Prior Publication Data

US 2008/0280616 A1    Nov. 13, 2008

Related U.S. Application Data

(60) Provisional application No. 60/564,091, filed on Apr. 21, 2004.

(51) Int. Cl.
*H04W 40/00* (2006.01)

(52) U.S. Cl. .................. 455/445; 455/428; 455/560; 455/424; 370/401

(58) Field of Classification Search .............. 455/422.1, 455/424, 428, 445, 560; 370/338, 352–356, 370/401; 379/9, 16–17, 15.01, 219–221.15
See application file for complete search history.

(56) References Cited

U.S. PATENT DOCUMENTS

| | | | | |
|---|---|---|---|---|
| 5,850,606 | A * | 12/1998 | Bedingfield et al. | 455/439 |
| 6,522,655 | B1 * | 2/2003 | Laiho | 455/445 |
| 6,522,741 | B1 | 2/2003 | Crowl | |
| 6,724,801 | B1 * | 4/2004 | Sylvain | 370/352 |
| 6,795,444 | B1 * | 9/2004 | Vo et al. | 370/401 |
| 7,283,518 | B2 * | 10/2007 | Vikberg et al. | 370/352 |
| 2002/0080947 | A1 | 6/2002 | Mikhailov et al. | |
| 2004/0235477 | A1 * | 11/2004 | Picha et al. | 455/439 |
| 2004/0266422 | A1 * | 12/2004 | Hotze et al. | 455/423 |
| 2005/0070288 | A1 | 3/2005 | Belkin | |
| 2005/0094623 | A1 | 5/2005 | D'Eletto | |

* cited by examiner

*Primary Examiner*—Kamran Afshar
(74) *Attorney, Agent, or Firm*—RG & Associates LLC

(57) ABSTRACT

Calls are routed in a distributed mobile switching center environment in response to receiving a call to be routed from a first switching mode (310(1)) to a second switching node (310(2)). An inter-switch mute for the call from the first switching node to the second switching node is identified. The inter-switch route includes an intermediate switching node (305) having multiple media gateway (320). An intra-switch route within the intermediate switching node is selected from multiple possible intra-switch routes for use in establishing the inter-switch route. Each of the intra-switch routes includes one or more interconnections (330) between media gateways. The call is connected using the identified inter-switch route and the selected intra-switch route.

19 Claims, 3 Drawing Sheets

MEDIA GATEWAY INTERCONNECT ROUTING IN A SOFTSWITCH ENVIRONMENT

REFERENCE TO RELATED APPLICATIONS

This application is related to and claims the benefit of co-pending provisional application Ser. No. 60/564,091, filed Apr. 21, 2004, which is incorporated herein by reference.

TECHNICAL FIELD

This description relates to telecommunications, and more particularly to routing calls in a distributed mobile switching center environment using media gateway interconnections.

BACKGROUND

Conventional cellular telecommunications networks include mobile switching centers (MSCs) each operating to route calls between base stations that include radio equipment for serving one or more cells in the cellular network and other MSCs or public switched telephone networks (PSTNs). Conventional MSCs handle both bearer traffic for transporting user information (e.g., voice or other data in an integrated services digital network (ISDN)) and signaling traffic for establishing and controlling call connections and managing the cellular network.

SUMMARY

Distributed MSCs (e.g., as can be used with 3GPP, Release 4) perform the same general functions as a conventional MSC but include an MSC server for handling signaling traffic and multiple media gateways for handling bearer traffic. The MSC server includes the intelligence and complexity of the distributed MSC, and the media gateways are controlled by the MSC server. The media gateways can be geographically distributed, can each control multiple base stations, and serve to route bearer traffic under control of the MSC server.

In one general aspect, a call to be routed from a first switching node to a second switching node is received, and an inter-switch route for the call from the first switching node to the second switching node is identified. The inter-switch route includes an intermediate switching node that includes multiple media gateways. An intra-switch route within the intermediate switching node is selected from multiple possible intra-switch routes for establishing the inter-switch route. Each of the intra-switch routes includes one or more interconnections between media gateways. The call is connected using the identified inter-switch route and the selected intra-switch route.

Implementations can include one or more of the following features. The intra-switch route is selected according to a selection algorithm. The inter-switch route is identified by selecting the inter-switch route from a list of inter-switch routes for use with calls to be routed from the first switching node to the second switching node. A received directory number for use in selecting the list of inter-switch routes for the call is translated. An availability of the identified inter-switch route is determined, and an availability of the interconnections of the selected intra-switch route is also determined. An unavailability of a candidate intra-switch route is determined based on an unavailability of one or more interconnections, and the intra-switch route is selected in response to determining the unavailability of the candidate intra-switch route. An intra-switch route is selected from a list of intra-switch routes associated with the identified inter-switch route. The intermediate switching node is associated with multiple trunks, at least one of which connects the intermediate switching node to the first switching node. One or more of the trunks also connects the intermediate switching node to the second switching node, and each interconnection is an interconnection between media gateways. The media gateways handle bearer traffic, and each of the media gateways operate under control of a server using signaling traffic associated with the bearer traffic.

In another general aspect, a telecommunications system includes a first switching node and a second switching node that is a distributed mobile switching center. One or more media gateways in the distributed mobile switching center have a trunk connection with the first switching node. A server of the distributed mobile switching center controls routing for the media gateways. The server selects, for a call connection, an intra-switch route that includes a first media gateway, a second media gateway, and one or more interconnections for connecting the first media gateway and the second media gateway. The intra-switch route is selected from multiple possible intra-switch routes designated for serving call connections routed through the first switching node and the second switching node.

Implementations can include one or more of the following features. The intra-switch routes are included in an interconnection route list designating a set of possible intra-switch routes from the first media gateway to the second media gateway. The server selects the intra-switch route based on a selection algorithm defining a sequence in which the intra-switch routes are selected from the interconnection route list. The selection algorithm includes one or more restrictions for selectively preventing use of an intra-switch route based on data relating to the call connection. The first switching node is a destination switching node, and the server of the second switching node identifies an external route from a list of external routes between the first switching node and the second switching node. The first switching node is an origination switching node for the call connection, which is destined for a third switching node.

The first switching node selects an inter-switch route, which includes the second switching node, from a list of routes for routing call connections from the first switching node to the third switching node, and the server selects the intra-switch route in response to a message from the first switching node. The server identifies an unavailability of a circuit in an initially selected intra-switch route and, in response to identifying the unavailability, selects an alternate intra-switch route that uses a different circuit on the initially selected intra-switch route or a different intra-switch route having one or more alternate interconnections. The one or more interconnections include circuits for handling bearer traffic in one or both directions, and the interconnections have an associated continuity testing attribute. The server handles signaling traffic for the distributed mobile switching center, and the media gateways handle bearer traffic for the distributed mobile switching center.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
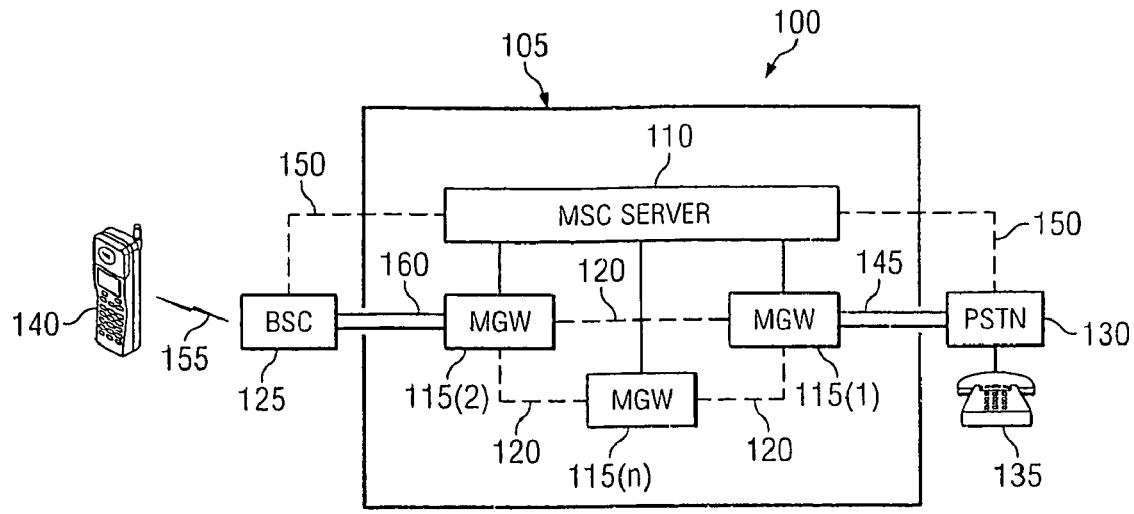
FIG. 1 is a block diagram of a telecommunications network that includes a distributed mobile switching center (MSC).

FIG. 1 is a block diagram of a telecommunications network 100 that includes a distributed mobile switching center (MSC) 105. The distributed MSC 105 includes an MSC server 110 that controls multiple media gateways (MGWs) 115(1) ... 115(n), which are connected by interconnections 120 through which bearer traffic can be routed between different media gateways 115. The media gateways 115 can be geographically distributed such that each media gateway 115 is associated with a number of base stations and/or base station controllers 125 that serve different geographical areas. One or more of the media gateways 115 interface with a PSTN 130 or other switching node, such as a mobile switching center.

When a call is placed from a telephone 135 in a fixed network to a mobile station 140 in a cellular network, the PSTN 130 routes the call through an originating trunk 145 to a media gateway 115(1) in the cellular network and sends signaling data to the MSC server 110 in, for example, an ISDN user part (ISUP) message 150. The MSC server 110 sends signaling data to a base station controller 125 serving an area in which the mobile station 140 is located for establishing a radio connection 155 with the mobile station 140. In addition, the MSC server 110 directs the media gateway 115(1) connected to the originating trunk 145 to route the call through an interconnection 120 to another media gateway 115(2) that is capable of connecting with the base station controller 125, if necessary (i.e., if the originating media gateway 115(1) is not connected to the base station controller 125). The MSC server 110 also directs the other media gateway 115(2) to route the call through a terminating trunk 160 to the base station controller 125 to establish a call connection between the telephone 135 and the mobile station 140.

Figure 2:
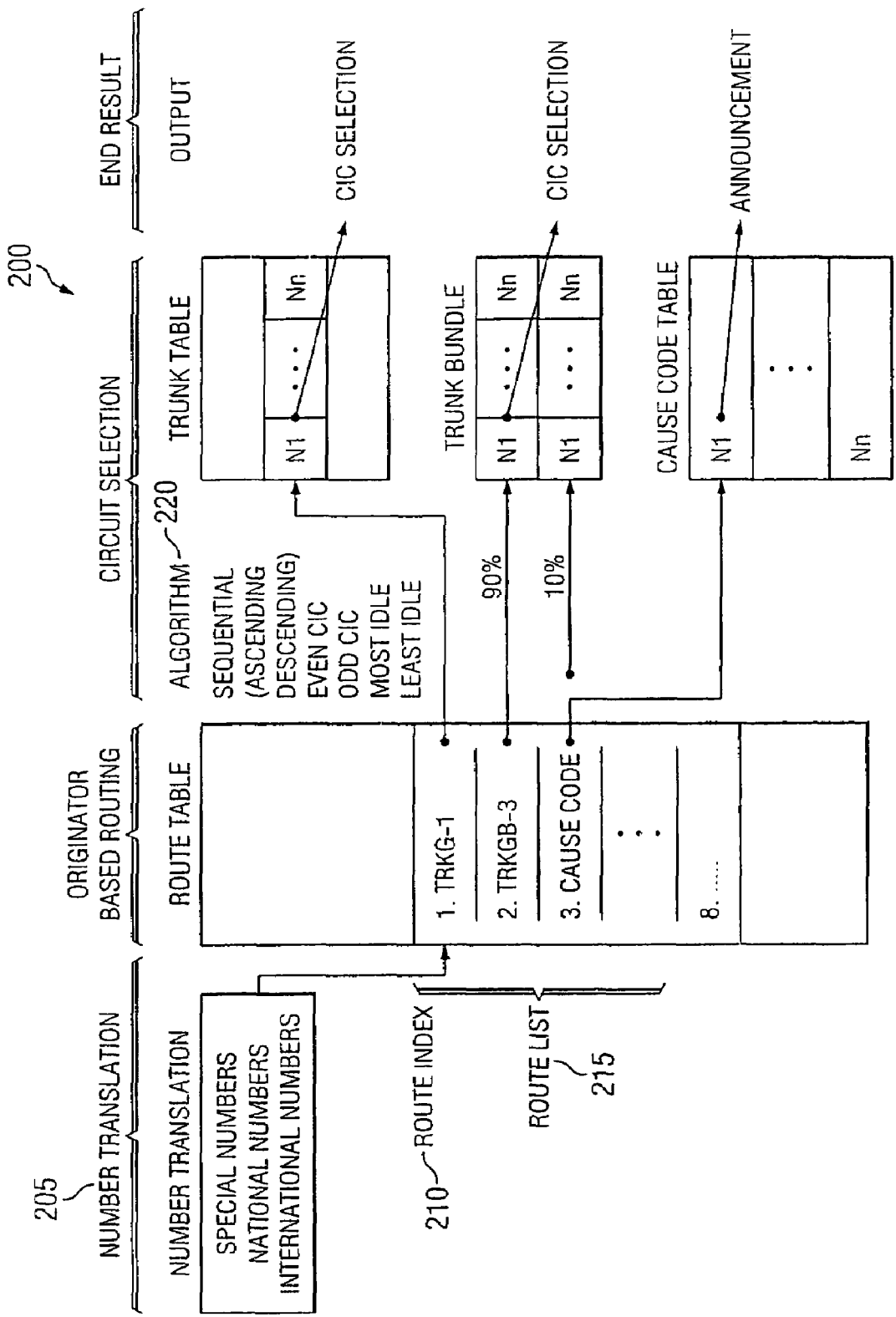
FIG. 2 is a schematic diagram of a routing methodology for selecting call routes.

FIG. 2 is a schematic diagram of a routing methodology 200 for selecting call routes. When a call is received, the called number is input to a number translation 205, in which the called number is translated. Using the translation, a route index 210 is identified based, for example, on the called number, a time, an originating party, an originating trunk, and/or a circuit from which the call is received. The route index 210 points to a route list 215 that includes a sequence of routing rules for routing the call. The route list 215 can include a number of entries, such as trunk group, trunk group bundle, cause code, and the like. Each entry can include data fields such as type, parameter, and out pulse index. Based on the route list 215, a circuit selection algorithm 220 is used to assign a terminating circuit for the call, which results in, for example, selection of a particular switching circuit or some other function (e.g., an announcement if a circuit is unavailable).

Figure 3:
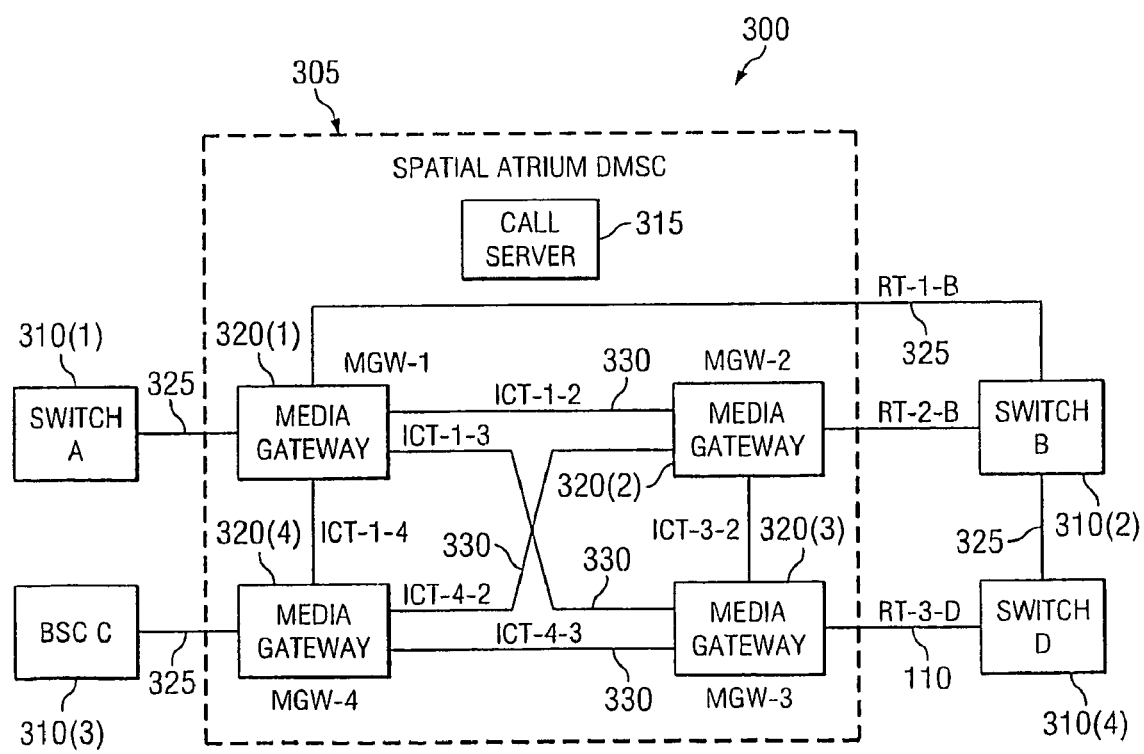
FIG. 3 is a block diagram of a network that includes a distributed MSC.

FIG. 3 is a block diagram of a network 300 that includes a distributed MSC 305. The network 300 includes multiple switches 310(1), 310(2), 310(3), and 310(4) external to the distributed MSC 305, each of which can be, for example, a switch in a PSTN, a conventional MSC, another distributed MSC or soft switch, or a gateway MSC. The distributed MSC 305 includes a call server 315 and a plurality of media gateways 320(1), 320(2), 320(3), and 320(4). The call server 315 contains the intelligence and primary processing resources for the distributed MSC 305. Accordingly, the call server 315 sends and receives signaling data to and from the external switches 310 and controls the switching activities of the media gateways 320. For example, call setup messaging is handled by the call server 315, and the call server 315 instructs the media gateways 320 to route calls using particular circuits. Thus, the call server 315 includes connections (not shown) with each of the media gateways 320 (for sending control data) and with the external switches 310 (for communicating signaling data).

The media gateways 320 handle bearer data under control of the call server 315. The media gateways 320 can be geographically distributed, such that a first media gateway 320(1) of the distributed MSC 305 serves a first geographical area and a second media gateway 320(1) serves a second geographical area, which are remote from one another and from the physical location of the call server 315. In some cases, two or more media gateways 320 can be located in the same geographical area but can still be remote from the call server 315 and/or other media gateways 320.

To the external switches 310, the distributed MSC 305 generally has the characteristics of a conventional switch. In other words, the logical and geographic separation of, including the division of functions between, the call server 315 from the media gateways 320 within the distributed MSC 305 is generally immaterial to the external switches. Thus, the distributed MSC 305 operates as a single switch from the point of view of the external switches 310.

Each media gateway 320 has one or more trunk connections 325 with one or more of the external switches. For example, the first media gateway 320(1) includes a trunk connection 325 with switch A 310(1) and a trunk connection 325 with switch B 310(2). In addition, each media gateway 320 has one or more interconnection trunks 330 with other media gateways 320. For example, the first media gateway 320(1) includes an interconnection trunk 330 with the second media gateway 320(2) and another interconnection trunk 330 with a third media gateway 320(3). The interconnection trunks 330 between media gateways can use time-division multiplexing (TDM), internet protocol (IP), and/or asynchronous transfer mode (ATM) for physically connecting the nodes. Each interconnection trunk 330 can be one-way (i.e., directional) connections or two-way connections and connects two media gateways 320. In an example implementation, each interconnection trunk 330 supports about 16,000 circuits. Generally, only one two-way or two one-way interconnection trunks 330 exist between each pair of media gateways 320.

In some possible implementations, only one route is defined between two media gateways 320 within the distributed MSC 305. For example, the first media gateway 320(1) can route calls to a fourth media gateway 320(4) using TDM circuits contained in a direct interconnection trunk 330 between the first media gateway 320(1) and a fourth media gateway 320(4). In such an implementation, if the call server 315 receives a signaling message indicating that a call is to be routed from switch A 310(1) to switch C 310(3), the call server 315 determines that the call is to be received from switch A 310(1) at the first media gateway 320(1), routed through an interconnection trunk 330 (i.e., ICT-1-4, where "ICT" stands for interconnection trunk and "1-4" indicates that the interconnection trunk 330 is between the first media gateway 320(1) and the fourth media gateway 320(4)), and sent from the fourth media gateway 320(4) to switch C 310 (3). If the call server 315 determines that the circuits between the first media gateway 320(1) and the fourth media gateway 320(4) (i.e., ICT-1-4) are unavailable (e.g., due to out of service and/or busy circuits), the call server 315 has to reject the call, which may then be connected through an alternate route that bypasses the distributed MSC 305.

In other implementations, multiple routes are defined within the distributed MSC 305 for connecting one particular media gateway 320 (e.g., the first media gateway 320(1)) to another media gateway 320 (e.g., the second media gateway 320(2)). By defining multiple routes (e.g., indirect routes) between each pair of media gateways 320, the distributed MSC 305 can provide transmission redundancy. Accordingly, if one intra-switch route is unavailable, a different intra-switch route (i.e., using a different combination of interconnection trunks 330) can be selected, and the call does not need to be routed through a different inter-switch route to bypass the distributed MSC 305.

Among other things, handling the call within the distributed MSC 305 can be desirable in some situations, such as when the geographic distribution of the media gateways 320 within the distribute MSC 305 allow an operator to avoid long distance fees that may be associated with re-routing the call so as to bypass the distributed MSC 305. For example, a bypass of the distributed MSC 305 may require the call to be routed through an inter-exchange carrier network, the use of which subjects the call to charges that can be avoided by routing the call between geographically distributed media gateways 320 within the distributed MSC 305.

The multiple routes between media gateways 320 (i.e., intra-switch routes) can be defined in an interconnection route list (ICRL). For example, when a call arrives at the first media gateway 320(1) of the distributed MSC 305 from external switch A 310(1), the call server 315 (in response to a message from switch A 310(1) requesting that the call server 315 set up the call) may identify a outbound trunk 325, with respect to the distributed MSC 305, from the second media gateway 320(1) to external switch B 310(2). As a result, a route from the first media gateway 320(1) to the second media gateway 320(2) needs to be identified. An interconnection route list for identifying connections between the first media gateway 320(1) and the second media gateway 320(2) can be:

ICRL-1-2={ICT-1-2,{ICT-1-4,ICT 4-2},{ICT-1-3, ICT-3-2}}, which defines a set of possible interconnection routes, including a direct route (i.e., ICT-1-2), a route that passes through the fourth media gateway 320(4) (i.e., {ICT-1-4, ICT-4-2}, and a route that passes through the third media gateway 320 (3) (i.e., {ICT-1-3, ICT-3-2}). Thus, an interconnection route list is a collection of routes that are designated for connecting one media gateway 320 to another media gateway 320.

In some cases, some of the interconnection routes can be subject to restrictions or preferences relating to data associated with the call. For example, an operator of the distributed MSC 305 may want to save valuable interconnection resources for its own customers. Thus, some interconnection routes may be reserved for the operator's customers. Other data associated with a call (e.g., the calling party's number, the called party's number, whether the call originates in another provider's network, the identity of the calling party's and/or called party's provider, the incoming or outgoing trunk, and the like) can also be used for implementing restrictions or preferences.

In addition, the interconnection routes can be selected using a selection algorithm that defines, for example, a sequence in which interconnection routes are selected from the interconnection route list. The selection algorithm can define a sequential selection (e.g., select the first interconnection route in the list until it is no longer available, then move to the next interconnection route, and so on), a percentage approach (e.g., for the first one hundred calls, select a first interconnection route until sixty calls are using the first interconnection route, select a second interconnection route until thirty calls are using the second interconnection route, select a third interconnection route until ten calls are using the third interconnection route, and repeat for each additional one hundred calls), or a most idle approach (e.g., select the interconnection route with the most idle interconnection trunks 330). Circuits within an interconnection route can also be selected according to a circuit selection algorithm.

In addition to the interconnection route list, and external route list can also be defined. The external route list can be used to identify a list of external switches 310 to which a call can be routed to the next switch in an overall inter-switch route. For example, if a call originates at switch A 310(1) and, based on a number translation, it is determined that the call is destined for switch B 310(2), switch A 310(1) may use a route table to determine that the call needs to be sent to the distributed MSC 305. The call server 315, in turn, determines, or is informed by switch A 310(1), that the call needs to be routed to switch B 310(2). The call server 315 can refer to an external route list associated with routing calls to switch B 310(2). The external route list for switch B 310(2) can include:

RT-1-B, RT-3-D, RT-2-B, indicating that possible routes from the distributed MSC 305 that can be used to reach switch B 310(2) include a route (i.e., RT-1-B) through the first media gateway 320(1), a route (i.e., RT-3-D) through the third media gateway 320(3) (and subsequently through a trunk between switch D 310(4) and switch B 310(2)), and a route (i.e., RT-2-B) through the second media gateway 320(2). The call server 315 can select an external route from the external route list and can used at least some of the same techniques (e.g., restrictions and preferences) as described in connection with use of the interconnection route list.

Figure 4:
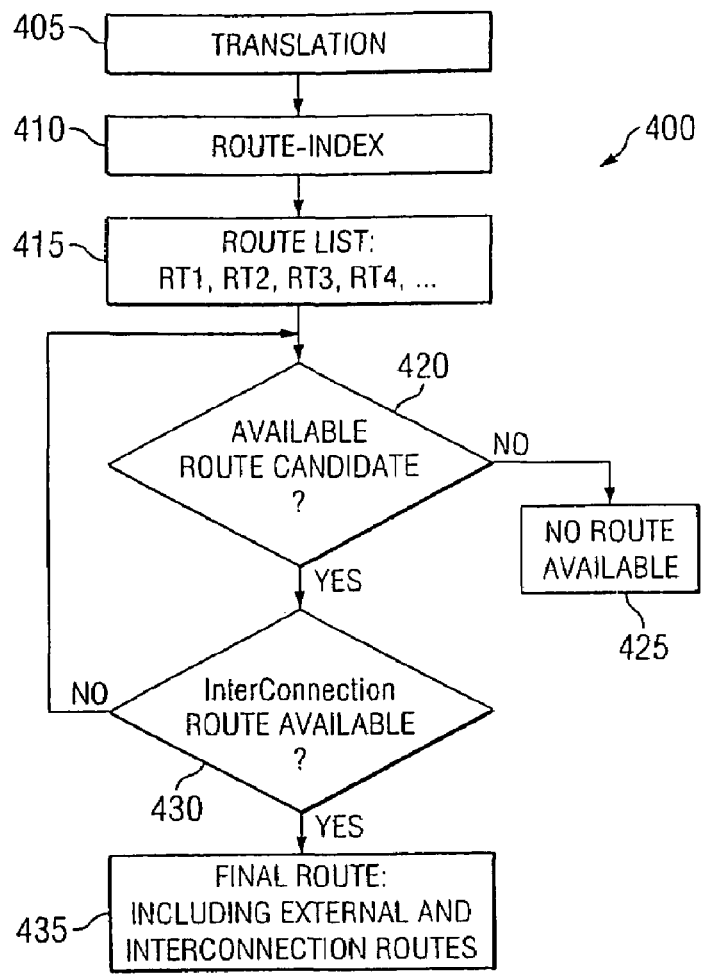
FIG. 4 is a flow diagram of a route selection process

FIG. 4 is a flow diagram of a route selection process 400. A dialed number is received and translated (405). The translation analyzes the received dialed number by, for example, extracting the area code, determining the type of number (e.g., a special number, such as *33 or 911), determining if it is long distance or local, and the like. The translation is used to refer to a route index (410), in which a route list corresponding to the translated number is identified (415). The route list defines routes that go from an origination switch (e.g., switch A 310(1)) to a termination switch (i.e., a destination switch, such as switch B 310(2)). A determination is made as to whether a route candidate from the route list is available (420). The determination may include determining if circuits for the trunks 325 necessary to establish a connection using the route candidate are idle and in service. If not, no route is available (425), and the call is rejected, in which case the call may need to be routed through an alternate switch.

If a route candidate is available (e.g., RT-2-B, in the external route list example above), a determination is made (430) as to whether an interconnection route necessary to establish the selected candidate route (e.g., RT-2-B) is available. This latter determination can include examining each interconnection route an interconnection route list (e.g., ICRL-1-2, in the interconnection route list example above) in an order dictated by a selection algorithm. If no interconnection routes from the interconnection route list are available, a determination is made as to whether another route candidate (e.g., RT-3-D) from the route list is available (420). If so, a determination is made (430) as to whether an interconnection route necessary to establish the newly selected candidate route (e.g., RT-3-D) is available.

This process repeats until an available route list and an available interconnection route are found or it is determined (at 420) that no further route lists are available. Once an available route list and an available interconnection route are found, a final route that includes an external route and an interconnection route is established (435), and the call can be connected. In some cases, such as if the route candidate selected is RT-1-B, no interconnection trunk 330 is necessary. By checking for an available interconnection route, the process 400 can ensure that an interconnection route is available before allocating resources for the call.

Figure 5:
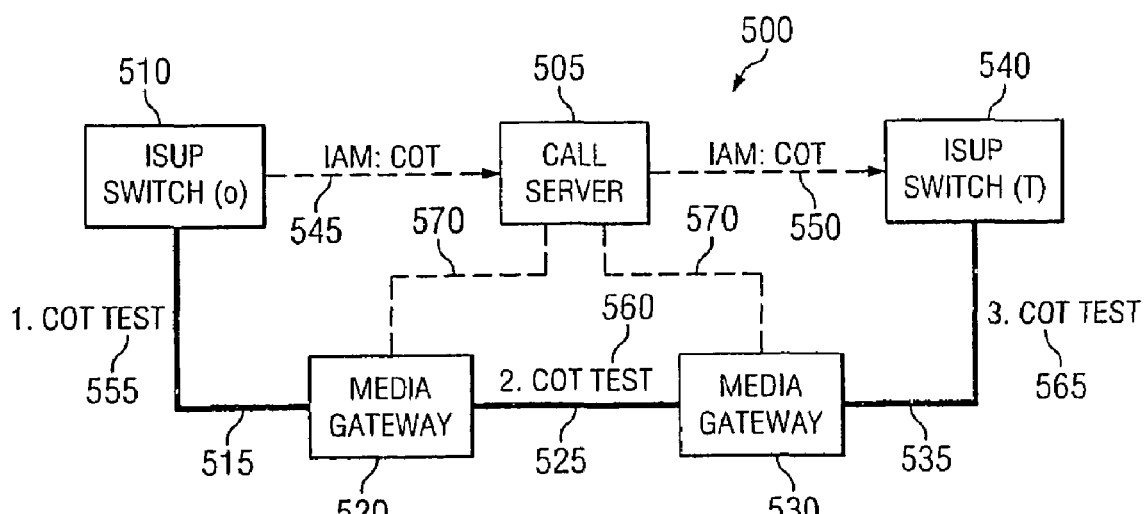
FIG. 5 is a block diagram of a continuity testing procedure for automatically testing whether circuits for connecting switches are in service and not experiencing problems or excessive delays.

FIG. 5 is a block diagram of a continuity testing procedure 500 for automatically testing whether circuits for connecting switches are in service and not experiencing problems or excessive delays. Continuity testing (COT) can be triggered in a call server 505 by an external COT request from an incoming call or as a result of an internal periodic setting (e.g., to ensure availability of the circuits). When a call is placed that is to be routed from an originating switch 510, across a first trunk 515, through a first media gateway 520, across an interconnection trunk 525, through a second media gateway 530, across a second trunk 535, and to a terminating switch 540, a first initial address message (LAM) 545 is sent from the originating switch 510 to the call server 505. The first IAM 545 includes a COT request. In accordance with the COT request, a first COT test 555 can be performed between the originating switch 510 and the first media gateway 520 before sending a second IAM 550 to the terminating switch 540.

A second COT test 560 can then be performed as part of the interconnection route selection process. For example, the call server 505 can signal the first media gateway 520 and the second media gateway 530 (through signals 570) to perform the second COT test 560. If a COT failure occurs in the second COT test 560, an alternate circuit or route can be selected for the call. If an alternate media gateway route is selected, another inter-media gateway COT can be performed on the circuits of the new media gateway route. The circuit that failed can be marked as out of service. After a successful second COT test 560, a second LAM 550 including a COT request is sent from the call server 505 to the terminating switch 540. As a result, a third COT test 565 is performed in accordance with typical ISUP COT procedure. Alarm conditions (e.g., critical, major, and minor) may be defined for when out of service circuits surpass a predefined threshold level. Other test procedures, such as a milliwatt test can also be used.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. Accordingly, other implementations are within the scope of the following claims.

What is claimed is:

1. A method for routing calls in a distributed mobile switching center environment, the method comprising:
receiving a call to be routed from a first switching node to a second switching node;
identifying an inter-switch route for the call from the first switching node to the second switching node, the inter-switch route including an intermediate switching node, wherein the intermediate switching node includes a plurality of media gateways;
selecting an intra-switch route within the intermediate switching node from a plurality of intra-switch routes within the intermediate switching node for establishing the inter-switch route, each of the plurality of intra-switch routes including at least one interconnection between media gateways; and
connecting the call using the identified inter-switch route and the selected intra-switch route;
wherein the first switching node comprises an origination switching node for the call connection destined for a third switching node, the first switching node operable to select an inter-switch route from a list of routes for routing call connections from the first switching node to the third switching node, the selected inter-switch route including the second switching node.

2. The method of claim 1 wherein identifying the inter-switch route comprises selecting the inter-switch route from a list of inter-switch routes for use with calls to be routed from the first switching node to the second switching node.

3. The method of claim 1 further comprising:
determining an availability of the identified inter-switch route; and
determining an availability of the at least one interconnection of the selected intra-switch route.

4. The method of claim 1 further comprising determining an unavailability of a candidate intra-switch route based on an unavailability of at least one interconnection, wherein selecting the intra-switch route is performed in response to determining the unavailability of the candidate intra-switch route.

5. The method of claim 1 wherein selecting an intra-switch route comprises selecting the intra-switch route from a list of intra-switch routes associated with the identified inter-switch route, the list of intra-switch routes including the plurality of intra-switch routes.

6. The method of claim 1 wherein the intermediate switching node is associated with a plurality of trunks, at least one of the plurality of trunks connecting the intermediate switching node to the first switching node and at least one of the plurality of trunks connecting the intermediate switching node to the second switching node, and each interconnection comprising an interconnection between media gateways.

7. The method of claim 1 wherein selecting the intra-switch route comprises selecting the intra-switch according to a selection algorithm.

8. The method of claim 1 further comprising translating a received directory number for the call, the received directory number for use in selecting the list of inter-switch routes.

9. The method of claim 1 wherein the plurality of media gateways are operable to handle bearer traffic, each of the plurality of media gateways operating under control of a server using signaling traffic associated with the bearer traffic.

10. A telecommunications system comprising:
a first switching node; and
a second switching node comprising a distributed mobile switching center including:
a plurality of media gateways, at least one media gateway having a trunk connection with the first switching node; and
a server operable to control routing for the plurality of media gateways, the server operable to select, for a call connection, an intra-switch route including a first media gateway, a second media gateway, and at least one interconnection for connecting the first media gateway and the second media gateway, the intra-switch route selected from a plurality of intra-switch routes designated for serving call connections routed through the first switching node and the second switching node;
wherein the first switching node comprises an origination switching node for the call connection destined for a third switching node, the first switching node operable to select an inter-switch route from a list of routes for routing call connections from the first switching node to the third switching node, the selected inter-switch route including the second switching node, and the server operable to select the intra-switch route in response to a message from the first switching node.

11. The telecommunications system of claim 10 wherein the plurality of intra-switch routes are included in an interconnection route list designating a set of possible intra-switch routes from the first media gateway to the second media gateway.

12. The telecommunications system of claim 10 wherein the first switching node comprises a destination switching node, the server of the second switching node identifying an external route from a list of external routes between the first switching node and the second switching node.

13. The telecommunications system of claim 11 wherein the server selects the intra-switch route based on a selection algorithm defining a sequence in which the plurality of intra-switch routes are selected from the interconnection route list.

14. The telecommunications system of claim 13 wherein the selection algorithm includes at least one restriction for selectively preventing use of an intra-switch route based on data relating to the call connection.

15. The telecommunications system of claim 10 wherein the server is operable to identify an unavailability of a circuit in an initially selected intra-switch route and, in response to identifying the unavailability, to select an alternate intra-switch route and that uses a different circuit on the initially selected intra-switch route or a different intra-switch route having at least one alternate interconnection.

16. The telecommunications system of claim 10 wherein the at least one interconnection comprises a plurality of circuits for handling bearer traffic in at least one direction, the interconnection having an associated continuity testing attribute.

17. The telecommunications system of claim 10 wherein the server handles signaling traffic for the distributed mobile switching center and the plurality of media gateways handle bearer traffic for the distributed mobile switching center.

18. A machine-readable medium storing instructions for causing data processing apparatus to:

receive data indicating a call to be routed from a first switching node to a second switching node through an intermediate switching node, the intermediate switching node having a plurality of geographically distributed media gateways connected by interconnections;

identify a first media gateway and a second media gateway of the plurality of geographically distributed media gateways for use in routing the call from the first switching node to the second switching node;

identify an interconnection route list corresponding to a routing between the first media gateway and the second media gateway, the interconnection route list having a plurality of different interconnection routes between the first media gateway and the second media gateway;

determine an availability of at least one of the different interconnection routes;

select an available one of the different interconnection routes; and allocate the selected interconnection route for use in routing the call from the first switching node to the second switching node;

wherein the first switching node comprises an origination switching node for the call connection destined for a third switching node, the first switching node operable to select an inter-switch route from a list of routes for routing call connections from the first switching node to the third switching node, the selected inter-switch route including the second switching node.

19. The machine-readable medium of claim 18 wherein the second media gateway is identified from an external route list having a plurality of external routes, each external route providing a possible route between the intermediate switching node and another switching node for used in routing the call from the first switching node to the second switching node.

* * * * *